United States Patent [19]
Decroupet et al.

[11] Patent Number: 5,838,482
[45] Date of Patent: Nov. 17, 1998

[54] OPTICAL CELL

[75] Inventors: Daniel Decroupet, Fosses-la-Ville; Pierre Laroche, Nalinnes, both of Belgium

[73] Assignee: Glaverbel, Brussels, Belgium

[21] Appl. No.: 737,278

[22] PCT Filed: May 16, 1995

[86] PCT No.: PCT/BE95/00047

§ 371 Date: Nov. 6, 1996

§ 102(e) Date: Nov. 6, 1996

[87] PCT Pub. No.: WO95/32450

PCT Pub. Date: Nov. 30, 1995

[30] Foreign Application Priority Data

May 20, 1994 [GB] United Kingdom .............. 9410261

[51] Int. Cl.⁶ .......................................... G02F 1/03
[52] U.S. Cl. .................. 359/253; 359/272; 359/296; 349/153
[58] Field of Search ................... 349/153, 189; 359/253, 272, 296

[56] References Cited

U.S. PATENT DOCUMENTS

| | | | |
|---|---|---|---|
| 3,655,267 | 4/1972 | Forlini | 350/150 |
| 3,744,126 | 7/1973 | Forlini et al. | 29/592 |
| 3,860,943 | 1/1975 | Tague | 354/295 |
| 3,967,882 | 7/1976 | Kubota et al. | 349/153 |
| 4,007,077 | 2/1977 | Yaguchi | 156/145 |
| 4,256,382 | 3/1981 | Piliavin et al. | 349/153 |
| 5,137,484 | 8/1992 | Bohannon | 349/189 |
| 5,184,239 | 2/1993 | Sano et al. | 359/80 |
| 5,279,511 | 1/1994 | DiSanto et al. | 445/24 |
| 5,410,423 | 4/1995 | Furushima et al. | 349/153 |
| 5,461,502 | 10/1995 | Shimotoyodome | 349/189 |
| 5,479,284 | 12/1995 | Watanabe et al. | 359/80 |
| 5,481,388 | 1/1996 | Aoya | 349/153 |

FOREIGN PATENT DOCUMENTS

| | | |
|---|---|---|
| 0534590 | 3/1993 | European Pat. Off. . |
| 2155910 | 5/1973 | France . |
| 59-131914 | 7/1984 | Japan . |
| 62-231213 | 10/1987 | Japan . |
| 1402137 | 8/1975 | United Kingdom . |
| 1476896 | 6/1977 | United Kingdom . |
| 2090011 | 6/1982 | United Kingdom . |

OTHER PUBLICATIONS

Martin Tobias, *International Handbook of Liquid Crystal Displays*, Ovum Ltd, London, 1975–1976, pp. 42–44.

*Primary Examiner*—Georgia Y. Epps
*Assistant Examiner*—Dawn-Marie Bey
*Attorney, Agent, or Firm*—Spencer & Frank

[57] ABSTRACT

An improved optical cell (light valve) of the type which includes a liquid suspension of particles orientable by an electrical field to vary the amount of luminous transmission is described. The cell comprises two adjacent plates held apart by a spacer to define a space occupied by the suspension. The cell further includes a first opening which passes through the spacer into the space to permit introduction of the suspension into the cell and a second opening which passes through the spacer at or near the furthest possible distance permitted by the configuration of the cell from the first opening, whereby the introduction of the suspension displaces through the second opening any fluid such as air which is initially present in the space.

22 Claims, 1 Drawing Sheet

OPTICAL CELL

BACKGROUND OF THE INVENTION

1. Field of the Invention.

The present invention relates to an optical cell (also known as a light valve) of the type which includes a material orientable by an electrical field to vary the amount of luminous transmission through the cell.

2. Description of the Related Art.

Various techniques have been proposed hitherto for the production of optical cells having variable luminous transmission. The techniques have included suspended particles, electrochromism, electrodeposition and liquid crystal technology. The cell is formed by sandwiching a layer of the sensitive material in a space created between adjacent parallel sheets of rigid, generally transparent material, typically thin sheets of glass.

The optical cells to which the present invention relates are those which incorporate a liquid suspension of solid particles capable of orientation by an electric field, such as described, for example, in U. S. Pat. No. 3,655,267 (Research Frontiers). These optical cells switch rapidly from a clear state, achieved when the electrical field is applied, to a dark state when the field is removed.

The surfaces of the parallel sheets facing the space to receive the liquid suspension are coated with an electrically conducting material and the sheets are held apart by an insulating peripheral gasket which also serves to seal the edges of the space. Electrical contact terminals are attached to the respective coatings.

Optical cells provide a means for variable light transmission in glazing panels or for variable light reflection in mirrors, both for vehicles or buildings. For example they can be used as a glazing panel adjustable between an opaque and clear condition to limit solar transmission or to conceal the interior of a room or vehicle to provide privacy therein. They can be used in a vehicle sun-visor, sunshine roof panel or a rear-view mirror or on an aircraft porthole.

The use of an optical cell on a mirror, and especially for a vehicle, rear-view mirror, demands a very high level of quality of the cell. It is important for the cell to have a highly uniform appearance, since every fault in the cell is much more clearly seen than in other applications such as glazing panels in buildings.

In a vehicle rear view mirror the cell is located adjacent and parallel to a reflective surface and in the line of sight between the reflective surface and the vehicle driver so as to provide a variable level of light reflection from the mirror to the driver. In full daylight the degree of luminous reflectivity from a rear-view mirror is required to be high, generally greater than 50% and more preferably greater than 65%. For very dull or nighttime conditions the reflectivity is limited, for example to 15% or less, in order to avoid dazzling of the driver by lights such as the headlights of following vehicles.

The required configuration of the optical cell is highly variable. It may be flat or curved, for example in a rear view mirror. Internal rear view mirrors are generally rectangular with rounded corners, but external rear view mirrors are generally of an irregular four-sided shape, still with rounded corners, or may be circular.

In a device such as a rear view mirror with an associated optical cell the reflective mirror surface can be applied to the cell sheet most distant from the viewer. The reflective surface, for example a layer of silver, can be deposited on the opposite surface of the sheet to that carrying the electrically conductive coating but alternatively can be deposited on the same face. In this latter configuration either a single layer can be applied which serves the purposes of reflection and electrical conduction or a multiple layer can be applied, comprising for example one or more reflective layers, typically of aluminium, chromium or silver, and one or more electrically conductive layers, typically of indium tin oxide (ITO), tin oxide or zinc oxide.

The variation in light transmission through the liquid suspension is achieved by the orientation of the particles. For most applications of optical cells it is important to maintain a substantially uniform distribution of particles throughout the suspending liquid. A sufficient density of particles is also required to ensure the desired level of darkness when the field is not applied. To assist in maintaining an even distribution of the densely packed particles the suspending liquid must be relatively viscous and the distance between the plates is small, typically less than 200 $\mu$m.

Several problems arise in filling the cell space because of its small thickness and because of the dense viscous nature of the liquid suspension. One method employed hitherto has been to insert through the peripheral gasket a narrow tube through which the suspension can be poured. U.S. Pat. No. 3,744,126 (Research Frontiers) describes such a filling tube and teaches a filling procedure in which any bowing of the cell walls, caused by an excess of fluid between the vertically-disposed cell walls, is remedied by removing the excess fluid either with a hypodermic syringe or by squeezing the walls together. Air is thereby forced out of the cell, in some instances together with some liquid.

EP 0 534 590 (Litton Systems Canada) describes a method for filling the cavity of a panel with a volatile fluid suspension by means of a small hole placed near a corner or edge in one of two plates defining the panel. Under the slight pressure of the fluid filling the cavity, air escapes through a similar "exit" hole located at the opposite corner or edge of the panel.

SUMMARY OF THE INVENTION

The present invention relates to an improved optical cell which can be more readily and reliably filled with a substantially air-free high density uniform suspension of orientable particles. The invention further relates to a cell-filling procedure having the object of ensuring an air-free high density uniform suspension of orientable particles.

According to the invention there is provided an optical cell comprising two adjacent plates which form a space to be filled with a viscous liquid suspension of electrically-orientable particles, the said space being bounded by a peripheral sealing ribbon, characterised in that the cell includes a first opening which passes through the sealing ribbon into the space to permit injection of the suspension into the cell and a second opening which passes through the sealing ribbon at or near the furthest possible distance permitted by the configuration of the cell from the first opening, whereby the injection of the suspension displaces through the second opening any fluid such as air initially present in the space.

The invention further provides a process for filling an optical cell by introducing a viscous liquid suspension of particles into a space between two adjacent plates and bounded by a peripheral sealing ribbon, characterised in that the suspension is injected into the space through a first opening in the sealing ribbon and the suspension displaces any fluid such as air initially present in the space through a second opening in the sealing ribbon, the second opening being at or near the furthest possible distance permitted by the configuration of the cell from the first opening.

By employing a combination of openings at or near the furthest possible distance from each other permitted by the configuration of the cell the injected suspension advances from the first opening across the space between the plates to the second opening as an unbroken front of liquid. This has the advantage that the fluid, usually air, initially present in the space can be completely swept out of the space by the advancing front so that no air bubbles are left in the space after the filling step.

In a further embodiment the invention provides a process for filling an optical cell by injecting a viscous liquid suspension of particles into a narrow space between two adjacent plates of sheet material and bounded by a peripheral sealing ribbon, characterised in that the plates and the viscous suspension are heated to a temperature in the range 40° to 95° C.

The heating of the plates and the suspension ensures that suspension passing into and through the space has a reduced viscosity and thus more readily fills the cell space. Whereas a typical viscosity for the suspension at an ambient temperature of about 20° C. is some 0.5 to 5 Pa.sec, the increased temperature can reduce its viscosity to about one half of that value or even less. At the preferred filling temperatures (between 40° and 95° C.) the viscosity of the suspension is generally between 0.15 and 2.5 Pa.sec.

The benefits of the invention are most marked if the filling rate and filling pressure of the liquid suspension are carefully selected. Preferably the suspension is injected at a rate which does not exceed 1 mm/sec across the cell space. The preferred minimum rate of injection is 0.01 mm/sec. More preferably the rate of injection is in the range 0.03 to 0.4 mm/sec, typically 0.1 to 0.4 mm/sec.

The said rates of injection refer to the mean rates, calculated from the total time taken to fill the cell with the suspension. The injected liquid front does not necessarily advance across the cell at a constant rate. In general the rate is greater in the earlier stage of filling than towards the end. One factor in slowing down the rate is that a degree of compression of the air in the cell builds up as the filling progresses, providing some resistance to the injection of the liquid. For example a linear injection rate of 0.6 mm/sec, calculated from the cell dimensions and the total filling time, would typically correspond to an initial rate of 0.85 mm/sec and a final rate of 0.35 mm/sec. In another example a linear injection rate of 0.06 mm/sec would typically correspond to an initial rate of 0.3 mm/sec and a final rate of 0.02 mm/sec. The former example is preferred in economic terms and the latter in terms of technical performance, especially when filling a cell having a large area.

The low rate of injection assists in avoiding both the formation of air bubbles in the cell space and any separation or agglomeration of components within the suspension, thereby avoiding a non-uniform distribution of the particles which would lead to a non-uniform appearance across the cell area. It also facilitates a uniform filling of the cell even if the internal surfaces of the plates are not perfectly smooth, thereby permitting filling of cells with a degree of roughness on the internal surfaces, for example internal surfaces carrying a rough electrically conductive layer.

The means of injecting the suspension can conveniently be a conventional syringe.

The pressure of the liquid suspension, measured at the point of introduction of the suspension into the first opening (for example at the outlet of an injecting syringe), is preferably in the range 5 to 100 kPa, most preferably 5 to 25 kPa, above the ambient pressure. Together with the constant venting of displaced fluid though the displacement opening these low injection overpressures help in avoiding such problems as bowing of the cell plates or pressure damage to the constituents of the suspension. There is also no need for the application of reduced pressure or a vacuum to draw material from the space, which again avoids the possibility of bowing of the plates, which in this instance would have been caused by the external ambient pressure.

For the filling step the cell is preferably disposed with the first opening at a lower level than the second opening. Preferably the attitude of the cell is such that the first opening is located at or near the lowermost point, whereby the action of gravity assists in maintaining a smooth front of suspension as it advances through the cell. By this means the rate of advance of the suspension across the cell is readily controllable by adjusting the injection overpressure of the suspension.

Following the filling step the cell is preferably laid at ambient temperature (typically 20° C.) in a substantially horizontal position for several minutes, preferably at least 5 minutes (for example for one hour), so that any pressure differences within the suspension are equalised. This equalisation further assists in achieving an even dispersion of particles across the suspension.

After the filling step and any equalisation step are complete the openings through the sealing ribbon are sealed to retain the liquid suspension in the cell.

The operational area of the cell, i.e. the area bounded by the peripheral sealing ribbon, is determined by the application to which the cell is to be put. For the different types of rear view mirrors the shape of the operational area varies from rectangular or an irregular four-sided shape, in which cases the openings are preferably located at or near mutually opposite corners of the ribbon, to circular, in which case the openings are preferably located at or near diametrically opposing positions from each other.

In all cases the surface of the sealing ribbon facing-the cell space preferably has a smooth profile with no sharp angles. Thus in all cases any corners in the ribbon profile are preferably rounded. The smooth ribbon profile further assists in ensuring that air bubbles are not formed in the cell space during the filling operation.

The suspension can conveniently be injected into the cell by a syringe inserted into the first opening. The tip of the syringe preferably has a sealing means, for example a rubber sealing ring disposed around the tip, to abut against the sealing ribbon or connecting means such as an insert tube and thereby to prevent any leakage of the suspension. Preferably the sealing means forms a hermetic seal with the opening. This greatly facilitates the injection by preventing the escape of air through the first opening.

The openings in the sealing ribbon are conveniently provided with tubes passing through the ribbon. This facilitates the introduction of liquid into the cell. The tubes are preferably of dimensions chosen to match the dimensions of the openings and should be sealed to the plates and the ribbon at the point where they pass through the ribbon. After the cell is completely filled with the suspension the tubes can be sealed by welding.

At the points in the sealing ribbon through which the tubes pass there is preferably provided in one or both of the plates a groove to receive the respective tube. This permits the use of tubes with an external diameter greater than the small inter-plate distance and thus a greater internal tube diameter, thereby providing less resistance to the fluid flow. The grooves preferably have a curved shape to match the outer curvature of the tubes and thereby to facilitate a good seal between the plates and tubes.

The distance between the opposing cell plates should generally be less than 200 µm, but can be as little as 2 µm and preferably should be in the range 15 to 150 µm, most preferably 40 to 60 µm. These distances are especially suitable for cells employed in rear view mirrors since they permit the establishment of an adequate electrical field between the two plates without applying an unduly high electrical potential between them.

Conveniently the sealing ribbon serves both to form the boundary of the space containing the liquid suspension and to space the cell plates at the required distance from each other. When serving this dual function the sealing ribbon preferably incorporates a particulate material having a particle shape and size which imposes a minimum distance between the plates. Alternatively the means for spacing the plates apart can be separate from the sealing ribbon, but in this case should preferably be on the side of the sealing ribbon remote from the enclosed space. Because in this separate arrangement the sealing function of the cell is provided by the sealing ribbon the separate spacer need not be continuous. Thus although such a separate spacer may be for example a solid gasket around the sealing ribbon it can also be formed by a set of individual studs, bars or other spacing pieces at suitable positions between the two plates.

In addition to the opposing cell plates being at a small distance from each other they should also desirably be at a substantially uniform distance from each other across the whole of their facing areas. For example, for a cell in which the distance between the opposing plates is between 40 and 60 µm this distance must be maintained within a tolerance of about 5 to 10 µm and preferably within 2 µm or the appearance of the cell may not be uniform. Furthermore problems may also arise in short circuiting of the electrical field between two adjacent points on the opposing faces. This uniform-distance requirement imposes certain limits on the material from which the plates can be formed. Thus although plastic materials such as polyethylene terephthalate can be considered, difficulties may occur in maintaining the constant spacing between the sheets of plastics material over the whole surface of the cell. In general it is therefore preferred to employ glass sheets.

The preferred electrically conducting material for the coating on the cell plates is indium tin oxide, which is both conductive and transparent. The material for any reflective coating on the plates is preferably silver, chromium or aluminium.

The material of the sealing ribbon may be for example a UV-cured acrylic resin adhesive or a thermally hardened epoxy resin. Any particles dispersed therein for the purpose of spacing the cell walls apart spacer are conveniently small spheres but can alternatively be of other shapes, for example, ellipsoidal or needle-shaped. The sphere diameter or, in the case of nonspherical particles, the smallest particle dimension should preferably magnitude as the required distance between the plates. They should be uniformly dispersed around the sealing ribbon. Suitable materials for the particles include glass and plastic materials such as polyurethane, polyethylene, polypropylene and polyvinyl chloride. They can be solid or hollow. In general the preferred particulate spacing materials are solid or hollow glass beads, typically with diameters in the range 37–53 µm.

The material of the first and second tubes (respectively the injection and displacement tubes) is conveniently a flexible plastic material such as polyethylene, polypropylene or polyvinyl chloride. Typical dimensions for these tubes may be an external diameter of about 0.9 mm and an internal diameter of about 0.5 to 0.6 mm. The external diameter is preferably slightly smaller (by about 0.1 mm) than the distance between the cell plates at the point of insertion of the tube. The tubes can be put into place after the sealing ribbon material has been applied but are more conveniently put into place prior to or simultaneously with the said material.

The suspension liquid is a viscous organic liquid. Examples include various fluorocarbon polymers and organic salts.

The suspended solid material is in the form of needle-shaped particles which can be oriented by an electrical field. A typical example is herapathite (quinine bisulphate periodide). Other examples include graphite, mica, garnet red, aluminium and perhalides of alkaloid acid salts.

The electrical field to be applied preferably has an alternating current with a frequency of the order of 3 to 20 kHz. The applied voltage is typically 40 to 140 V. The use of an alternating current of such frequencies avoids migration of the suspended particles across the narrow distance between the adjacent plates, which migration would again adversely affect the appearance required from the cell.

The combination of electrically orientable material and electrical control means can be chosen to give a variation between a fully clear and fully dark condition but can also be chosen to give continuous variation between these limits. The configuration of cell and its means for electrical adjustment is such that it is clear when a voltage is applied and dark when no voltage is applied, with intermediate levels of light transmission being achieved by adjusting one or both of the strength of voltage and the concentration of the electrically-orientable particles in the suspension.

In order to vary the luminous transmissivity or reflectivity of the optical cell, it is sufficient to vary the applied voltage. Another option is to vary the frequency, but this is less efficient. The variation in luminosity depends on the applied voltage up to a saturation limit. Without the influence of the electric field, the particles are subject to Brownian movement in the liquid and light does not pass easily through the optical cell. When the field is weak, the particles tend to align themselves with the field but continue to oscillate about their mean position and thus provide some light absorption. It is necessary to reach a certain threshold value for the electric field, for example corresponding to a voltage of about 100 V, in order for the particles to be fully aligned in the field and thus for no light absorption to occur.

Variation of the luminous transmissivity or reflectivity of an optical cell can be achieved by manual adjustment or automatically by an electronic circuit controlled by at least one photo-sensitive optical device which detects the intensity of incident fight. If an automatic electronic circuit is employed it is advantageously controlled by at least two light detection devices. If the device being controlled is a rear view mirror, the first light detection device is typically positioned to detect potentially-dazzling light coming from the rear of the vehicle and the second is positioned to detect the ambient lighting conditions, for example being directed to receive light coming through the windscreen or a transparent roof panel or ambient light reflected within the vehicle.

BRIEF DESCRIPTION OF THE DRAWINGS

By way of example the invention is further described below with reference to the accompanying drawings. The invention is not limited to their specific embodiments. In the drawings.

DESCRIPTION OF THE PREFERRED EMBODIMENTS

Figure 1:
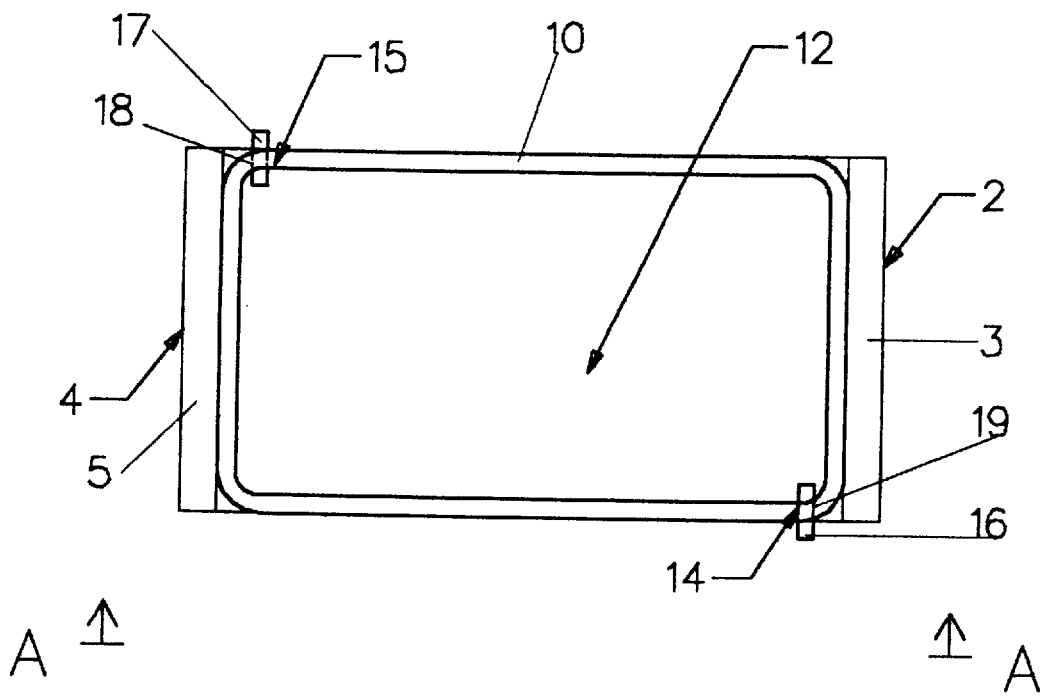
FIG. 1 is a plan view of an optical cell according to the invention.
Figure 2:
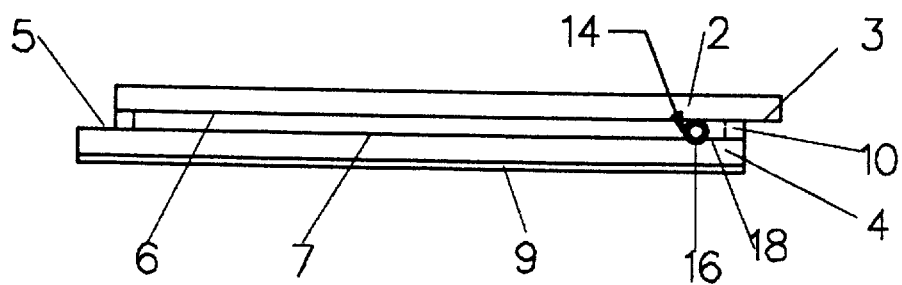
FIG. 2 is a side view of the optical cell of FIG. 1, as seen from line A—A in FIG. 1. The scale of FIG. 2 has been increased in the vertical direction so as to show the constituent parts of the cell in greater clarity.

The optical cell, which is of a type suitable for use in a vehicle rear view mirror, comprises two parallel equal-area rectangular plates 2,4 of 1.5 mm thickness non-toughened glass. The plates 2,4 overlap for most of their area but are offset relative to each other along their longer axes so as to provide lands, respectively 3 and 5, extending beyond the area of overlap.

The surfaces of the plates 2,4 which face each other have electrically conducting layers, respectively 6 and 7, of indium tin oxide (ITO). The lands 3,5 thus provide contact areas for attachment of electrical conductors (not shown) to each of the plates 2,4, whereby the plates 2,4 are connected to an electrical control circuit (also not shown). The surface of the plate 4 opposite the ITO-coated surface is itself coated with a reflective layer 9 of silver. In an alternative configuration the plates are superimposed without an overlap. Each plate contains a slot to provide a contact zone for connection of the electrically conducting layers to an electrical control circuit A sealing ribbon 10 between the plates 2,4 extends around the whole periphery of their overlapping area and thereby creates an enclosed space 12 bounded by the plates 2,4 and the ribbon 10. The material of the ribbon 10 is a UV-cured acrylic resin adhesive which additionally includes a dispersion of spherical glass beads of maximum diameter about 50 μm. The sealing ribbon 10 thus serves both to provide a seal around the periphery of the enclosed space 12 and to keep the plates 2,4 apart at a uniform distance of about 50 μm. The enclosed space 12 contains a viscous liquid suspension of electrically-orientable particles.

Tubular openings 14,15 pass through the sealing ribbon 10 at opposite corners thereof and tubes 16,17 of 0.9 mm external diameter pass through the said openings 14,15 respectively. A groove 18 is formed in the plate 4 at the point where the tube 16 passes through the sealing ribbon 10 so as to accommodate the tube 16. A similar groove 19 is formed in the plate 4 at the opposite corner of the sealing ribbon 10 so as to accommodate the tube 17. The tubes are shown in FIG. 1 as they appear prior to a sealing step which follows the introduction of the liquid suspension into the cell.

In manufacturing the cell the coated and grooved plate 4 is firmly held while the ends of the tubes 16,17 are placed in the respective grooves 16,17. The adhesive/bead material is then applied to form the ribbon 10 and the plate 2 is then put into position on the ribbon 10.

After the ribbon adhesive has set the cell is put into an oven at 50° C. and is positioned so that the shorter sides of the plates 2,4 are substantially vertical, with the tube 16 at the lower edge of the cell and the tube 17 at the upper edge. The liquid suspension, also at 50° C. is then slowly introduced through the tube 16 such that a front of the suspension advances up and across the space 12 and sweeps out the air initially present in the space 12, the air being vented through the tube 17.

The liquid suspension comprises electrically orientable particles in a viscous liquid medium. The particles are typically the reaction product of calcium iodide, iodine and pyrazine dicarboxylic acid. They are given a coating of mixed polymers and suspended in a fluorocarbon polymer medium. Such a liquid suspension has a viscosity of about 2 Pa.sec at 20° C. and about 1 Pa.sec at 50° C.

When the space 12 is completely filled with the liquid suspension the cell is removed from the oven and laid in a horizontal position at ambient temperature (about 20° C.) to permit equalising of any pressure differences within the space 12. The cell is allowed to cool to ambient temperature and the tubes 16,17 are sealed. It is thereafter provided with electrical connections ready for insertion into a housing.

We claim:

1. An optical cell, comprising:

two adjacent plates which form a space to be filled with a viscous liquid suspension of electrically-orientable particles, the space being bounded by a peripheral sealing ribbon, wherein the cell includes a first opening which passes through the sealing ribbon into the space to permit injection of the suspension into the cell and a second opening which passes though the sealing ribbon at or near the furthest possible distance permitted by the configuration of the cell from the first opening, so that the injection of the suspension displaces through the second opening any fluid initially present in the space, and wherein the surface of the sealing ribbon facing the space has a smooth profile with no sharp angles.

2. An optical cell as claimed in claim 1, wherein a tube pass through one or both of the openings.

3. An optical cell as claimed in claim 2, wherein a groove (18,19) to receive the respective tube (16,17) is provided in one or both of the plates (2,4) at the points in the sealing ribbon (10) through which the tubes (16,17) pass.

4. An optical cell as claimed in claim 3, wherein the groove or grooves have a curved shape to match the outer curvature of the tubes.

5. An optical cell as claimed in claim 1, wherein the cell has a substantially rectangular shape and the openings are located at or near mutually opposite corners of the rectangle.

6. An optical cell as claimed in claim 1, wherein the plates are formed of glass sheets.

7. An optical cell as claimed in claim 1, wherein the distance between the plates is in the range 2 to 200 μm.

8. An optical cell as claimed in claim 7, wherein the distance between the plates is in the range 15 to 150 μm.

9. An optical cell as claimed in claim 1, wherein the sealing ribbon serves both to form the boundary of the space containing the liquid suspension and to keep the cell plates at the required distance from each other.

10. An optical cell as claimed in claim 9, wherein the sealing ribbon incorporates a particulate material having a particle shape and size which imposes the required minimum distance between the plates.

11. An optical cell as claimed in claim 9, wherein the particulate material is glass beads.

12. An optical cell as claimed in claim 1, wherein the plates are spaced at the required distance from each other by means separate from the sealing ribbon.

13. An optical cell as claimed in claim 12, wherein the spacing means is at least one of a solid gasket, individual studs and bars.

14. A process for filling an optical cell, comprising:

introducing a viscous liquid suspension of pantiles into a space between two adjacent plates and bounded by a peripheral sealing ribbon, wherein the suspension is injected into the space through a first opening in the sealing ribbon and the suspension displaces any fluid initially present in the space through a second opening in the sealing ribbon, the second opening being at or near the furthest possible distance permitted by the configuration of the cell from the first opening, and wherein the suspension is injected at a rate which does not exceed 1 mm/sec across the cell space.

15. A process as claimed in claim 14, wherein the plates and the suspension are heated for the introduction of the suspension to a temperature in the range 40° to 95° C.

16. A process as claimed in claim 14, wherein the plates and the suspension are heated for the introduction of the suspension to a temperature in the range 40° to 95° C.

17. A process as claimed in claim 14, wherein the suspension is injected at a rate in the range 0.03 to 0.4 mm/sec.

18. A process as claimed in claim 14, wherein filling is conducted with the cell disposed with the first opening at a lower level than the second opening.

19. A process as claimed in claim 18, wherein the attitude of the cell during filling is such that the first opening is located at or near the lowermost point.

20. A process as claimed in claim 14, wherein after filling with the suspension the cell is laid in a substantially horizontal position for at least 5 minutes so that any pressure differences within the suspension are equalized.

21. A process for filling an optical cell, comprising:

introducing a viscous liquid suspension of pantiles into a space between two adjacent plates and bounded by a peripheral sealing ribbon, wherein the suspension is injected into the space through a first opening in the sealing ribbon and the suspension displaces any fluid initially present in the space through a second opening in the sealing ribbon, the second opening being at or near the furthest possible distance permitted by the configuration of the cell from the first opening, and wherein the pressure of the suspension, measured at the point of introduction of the suspension into the first opening, is in the range of 5 to 100 kPa above the ambient pressure.

22. A process as claimed in claim 21, wherein the pressure of the suspension, measured at the point of introduction of the suspension into the first opening, is in the range 5 to 25 kPa above the ambient pressure.

* * * * *